(12) United States Patent
Mullen

(10) Patent No.: US 8,301,181 B2
(45) Date of Patent: Oct. 30, 2012

(54) OSCILLATOR CALIBRATION

(75) Inventor: Sean Mullen, Northumberland (GB)

(73) Assignee: Ubiquisys Limited, Menlo Park, CA (US)

( * ) Notice: Subject to any disclaimer, the term of this patent is extended or adjusted under 35 U.S.C. 154(b) by 479 days.

(21) Appl. No.: 12/274,995

(22) Filed: Nov. 20, 2008

(65) Prior Publication Data

US 2009/0163246 A1  Jun. 25, 2009

(30) Foreign Application Priority Data

Nov. 23, 2007 (GB) .................................. 0723098.0

(51) Int. Cl.
*H04B 7/00* (2006.01)
*H04B 7/212* (2006.01)
*H04J 3/06* (2006.01)
*H04L 7/00* (2006.01)
*H04L 7/04* (2006.01)

(52) U.S. Cl. ........ 455/502; 370/324; 370/350; 370/503; 370/516; 370/519; 375/354; 375/362; 375/376

(58) Field of Classification Search .............. 455/84–87, 455/502–503; 370/324, 350, 232–235, 503–520; 375/354–376
See application file for complete search history.

(56) References Cited

U.S. PATENT DOCUMENTS

| | | | |
|---|---|---|---|
| 6,243,372 B1* | 6/2001 | Petch et al. ................... | 370/350 |
| 6,928,473 B1* | 8/2005 | Sundaram et al. ............. | 709/224 |
| 7,415,044 B2* | 8/2008 | Kallstenius ................... | 370/516 |
| 7,561,598 B2* | 7/2009 | Stratton et al. ................ | 370/507 |
| 2004/0258099 A1* | 12/2004 | Scott et al. .................... | 370/503 |
| 2005/0041692 A1* | 2/2005 | Kallstenius ................... | 370/503 |
| 2006/0013263 A1* | 1/2006 | Fellman ........................ | 370/503 |
| 2006/0256820 A1* | 11/2006 | Ilnicki et al. .................. | 370/503 |

FOREIGN PATENT DOCUMENTS

| | | |
|---|---|---|
| WO | 01/50674 | 7/2001 |
| WO | 02/13430 | 2/2002 |
| WO | 2004/075447 | 9/2004 |

(Continued)

OTHER PUBLICATIONS

International Search Report, dated Feb. 24, 2009, issued in corresponding International Application No. PCT/GB2008/051104.

(Continued)

*Primary Examiner* — Matthew Sams
(74) *Attorney, Agent, or Firm* — Weaver Austin Villeneuve and Sampson LLP

(57) ABSTRACT

A basestation for a cellular communication system has an interface, for connection to a computer network, and also includes an oscillator, for generating wireless transmit and receive frequencies. A controller receives timestamped response messages from a time server over the computer network, each response message being subject to a network propagation delay, which is a sum of a minimum network propagation delay and a jitter component. For each received response message an apparent network propagation delay is determined as a function of a difference between a first timestamp applied by the time server and a second timestamp based on a clock derived from said oscillator. A subset of the received response messages are selected, whose network propagation delays include minimal jitter components. The frequency accuracy of the oscillator is then determined based on changes over time in the apparent network propagation delays of the selected received response messages. The oscillator can then be adjusted based on this frequency accuracy.

4 Claims, 4 Drawing Sheets

FOREIGN PATENT DOCUMENTS

WO 2005/020486 3/2005

OTHER PUBLICATIONS

Fasbender, A. et al., On Assessing Unidirectional Latencies in Packet-Switched Networks, Communications, 1997, ICC '97 Montreal, Towards the Knowledge Millennium, 1997 IEEE International Conference, Montreal, Que., Canada Jun. 8-12, 1997, New York, NY, USA, IEEE, US, vol. 1, Jun. 8, 1997, pp. 490-494.

UK Search Report dated Mar. 4, 2008 from corresponding UK Application No. GB0723098.0.

European First Examination Report for Application No. GB0723098.0 mailed Jan. 25, 2012.

* cited by examiner

OSCILLATOR CALIBRATION

This invention relates to a method of calibrating an oscillator, and in particular to a method of calibrating an oscillator using data from a network time server, and to an oscillator control system using such a method.

A basestation, for use in a mobile communications network, must often be able to generate signals having frequencies that are highly accurate. For example, using a signal generated by an oscillator within the basestation, the basestation must be able to transmit a signal with a frequency that is within a very tightly specified frequency band. This puts very stringent requirements on the accuracy of the oscillator itself.

However, conventional oscillators having the required accuracy are somewhat expensive. In the case of a basestation, such as a femtocell basestation, that is only intended to provide service for a relatively small number of users, this expense is hard to justify.

It has therefore been proposed that the femtocell basestation should include a relatively low cost, and thus inherently somewhat inaccurate oscillator, but should include a mechanism for monitoring and maintaining the required frequency accuracy of the oscillator. Since each femtocell basestation has a computer network connection, such as an internet connection allowing traffic to be passed to and from the core network of the mobile network operator, the femtocell basestation can receive time information from a time server.

By measuring the time difference between the arrival times of multiple time packets, as measured by a clock derived from the oscillator, and comparing this time difference with the time difference as measured at the time server, the oscillator control system can monitor the frequency accuracy of the oscillator.

According to a first aspect of the present invention, there is provided a method of determining an accuracy of an oscillator used to generate a local clock signal, the method comprising:
  receiving a plurality of timestamped response messages from a time server over a computer network, each of said response messages being subject to a network propagation delay, said network propagation delay being a sum of a minimum network propagation delay and a jitter component;
  for each received response message, determining an apparent network propagation delay as a function of a difference between a first timestamp applied by the time server and a second timestamp based on a clock derived from said oscillator;
  selecting a subset of the received response messages whose network propagation delays include minimal jitter components; and
  determining the accuracy of the oscillator based on changes over time in the apparent network propagation delays of the selected received response messages.

According to a second aspect of the present invention, there is provided a basestation for a cellular communication system, comprising:
  an interface, for connection to a computer network;
  an oscillator, for generating a clock signal;
  a controller, for adjusting the oscillator, wherein the controller is adapted to:
  receive a plurality of timestamped response messages from a time server over the computer network, each of said response messages being subject to a network propagation delay, said network propagation delay being a sum of a minimum network propagation delay and a jitter component;
  for each received response message, determine an apparent network propagation delay as a function of a difference between a first timestamp applied by the time server and a second timestamp based on the clock signal;
  select a subset of the received response messages whose network propagation delays include minimal jitter components;
  determine the accuracy of the oscillator based on changes over time in the apparent network propagation delays of the selected received response messages; and
  adjust the oscillator based on said determined accuracy.

This allows for the calibration of an oscillator without the need for user or operator intervention, thus allowing the use of a relatively low cost, and inherently somewhat inaccurate, oscillator to provide signals with a high degree of frequency accuracy.

The invention will now be described with reference to the following drawings, by way of an example.

FIG. 1 illustrates a computer network operating in accordance with the present invention.

Figure 1:
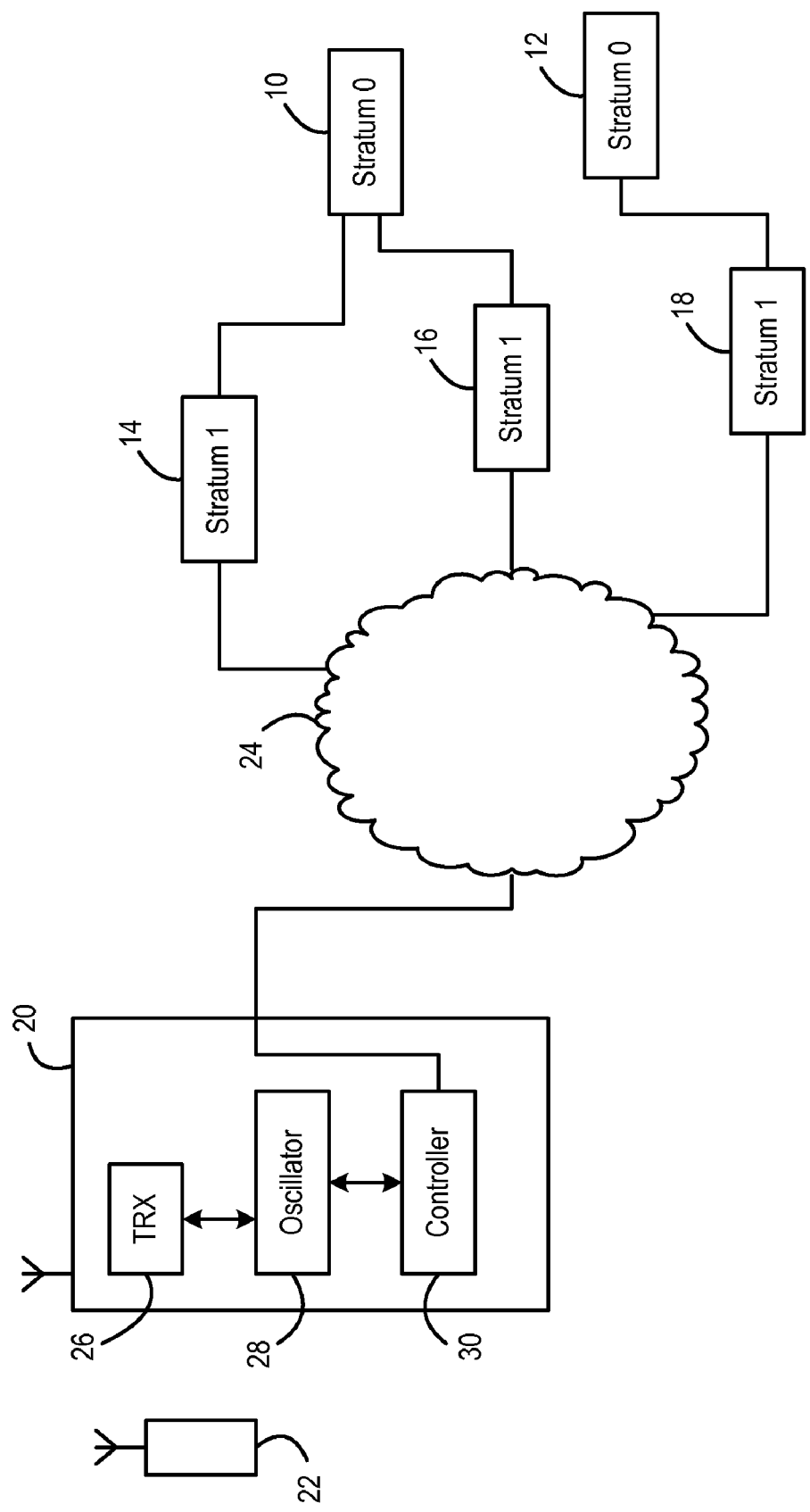
FIG. 1 is a block schematic diagram of a part of a communications network operating in accordance with the present invention.

As is known, there exist time server computers, which can be accessed over computer networks to provide network-connected devices with accurate time information using the Network Time Protocol. As shown in FIG. 1, there are Stratum 0 devices 10, 12, which are typically extremely accurate clocks. Connected to the Stratum 0 devices 10, 12 are Stratum 1 devices 14, 16, 18, which are inevitably slightly less accurate than the Stratum 0 devices, but which are sufficiently accurate to be used as time servers by a wide range of other devices.

In this case, there is shown a femtocell basestation 20, which is able to establish a connection over a specified wireless interface with one or more mobile devices 22 located within its radio coverage area. The femtocell basestation 20 has a connection to the internet 24, which it uses for receiving traffic from the core network of the mobile network operator of whose network it forms a part. It is of course then also able to use the internet connection to establish a connection to one or more of the time servers 14, 16, 18.

The femtocell basestation 20 includes radio transceiver circuitry (TRX) 26, which has to be able to transmit and receive signals on specified frequencies with a high degree of accuracy, in order to comply with the relevant standards. The transmit and receive frequencies are generated from signals generated by an oscillator 28. In order to reduce the cost of the femtocell basestation 20, it is advantageous to be able to use an oscillator 28 that is inherently unable to generate signals with the required frequency accuracy. For example, the oscillator 28 may therefore be a voltage controlled oscillator, which generates signals at frequencies that can be adjusted by control voltages applied thereto, and is controlled by a controller 30 that can connect over the internet 24 to one or more of the time servers 14, 16, 18.

Figure 2:
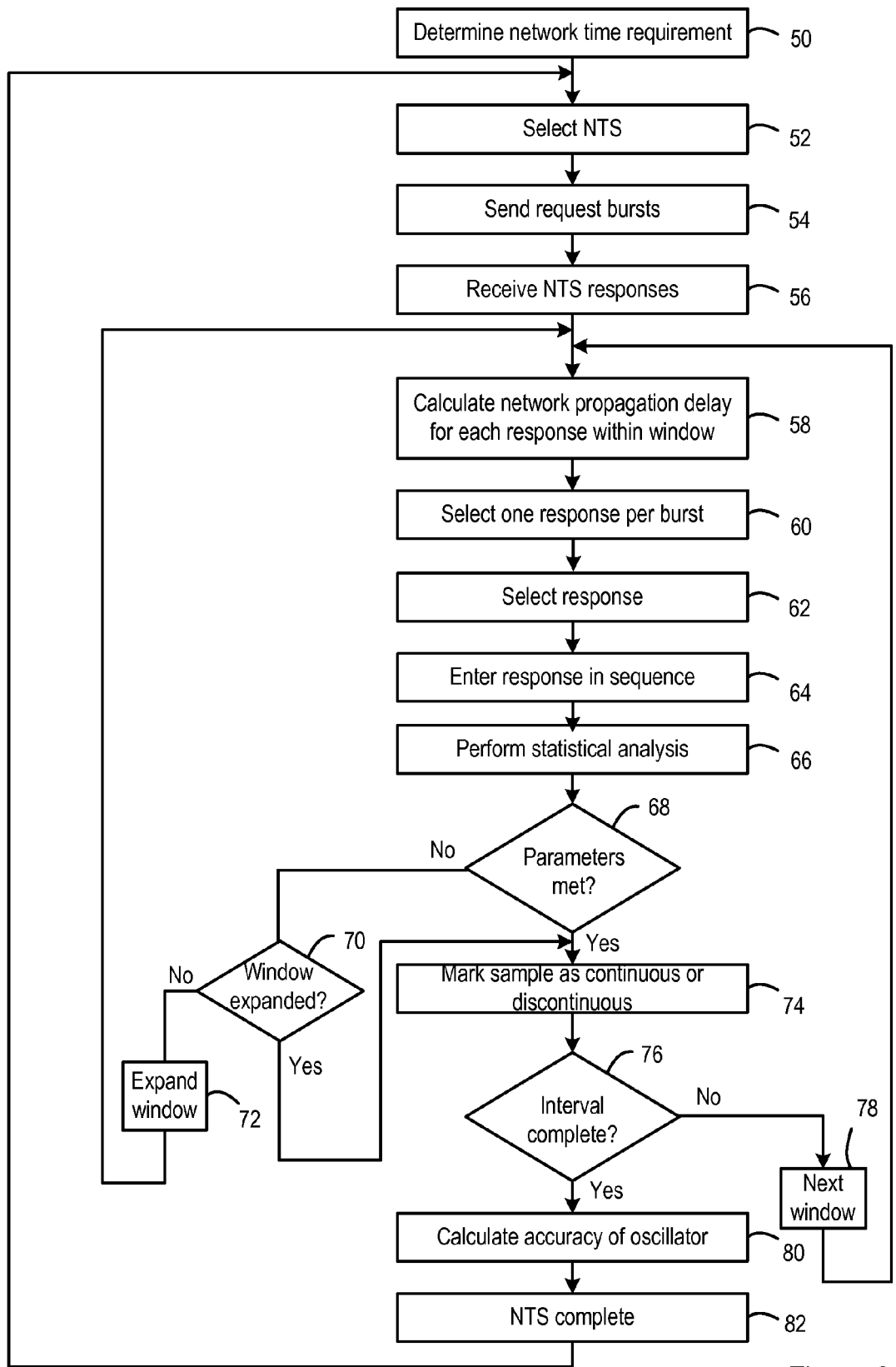
FIG. 2 is a flow chart, illustrating a method in accordance with the present invention.

In order to be able to control the oscillator 28, and thus ensure the required frequency accuracy, a control process is performed in the controller 30, as described with reference to FIG. 2.

Periodically, the controller 30 determines that it is necessary to check the frequency accuracy of the oscillator 28. This check may be performed at regular intervals, or when a specified event indicates that a check is required, or when some measured parameter (for example such as an ambient temperature) suggests that a check may be required. One method is to take measurements from signals received from other basestations in the mobile network, calculate the frequency error of the receive frequency and correct the local oscillator accordingly.

An alternative method, in accordance with an aspect of the present invention, may be used, for example when it is not possible to detect signals from any other basestations. Thus, in step 50 of the process shown in FIG. 2, it is determined that it is necessary to check the frequency accuracy of the local oscillator 28 using Network Time Servers (NTS) operating in accordance with the Network Time Protocol. Responses from the time servers allow the controller 30 to acquire accurate time references, and from these time references calculate the frequency of the local oscillator, and adjust it if required. There are several protocols for acquiring a time reference from an NTS. In the embodiment described here, NTPv4 is used, but the invention is not limited to use of this protocol.

The method in accordance with the present invention relies on reading a timestamp applied to an NTS response message, and comparing it with a timestamp applied in the femtocell basestation 20 to obtain a value for a network delay. The method relies on the assumption that there is a certain minimum network delay, which will remain essentially constant over time, and hence that apparent changes in this minimum network delay over time will be caused by inaccuracies in the clock in the femtocell basestation 20 (caused in turn by frequency inaccuracy in the oscillator 28). However, each individual response message from the NTS to the femtocell basestation 20 will be subject not only to this minimum network delay, but possibly also to an additional delay, referred to as jitter. The method in accordance with the present invention therefore attempts to select response messages that have been subject only to minimum network delay, in order to be able to detect any apparent changes in this minimum network delay over time. The frequency inaccuracy that might have caused such apparent changes can then be corrected.

In step 52 of the process, the controller 30 selects a Network Time Server (NTS), for example the time server 14 shown in FIG. 1. In one preferred embodiment of the invention, the controller is simultaneously using multiple time servers to obtain information regarding the accuracy of the oscillator 28. Thus, for example, the process shown in FIG. 2 may be performed in parallel using each of the time servers 14, 16, 18. The results from these processes can then be compared, and used together to correct any detected inaccuracy in the frequency generated by the oscillator 28. For example, the frequency inaccuracy in the oscillator 28 can be detected by examining an average of the results obtained from multiple time servers. However, if the results obtained from the comparison with one time server suddenly start to suggest an increasing frequency inaccuracy in the oscillator 28, while the results obtained from other time servers do not suggest such a change, this may in fact imply that there is an inaccuracy in that one time server, rather than in the oscillator 28.

In step 54, the controller starts to send bursts of requests to the selected time server regularly throughout a measurement interval. For example, the controller 30 may send bursts each containing four requests during one burst period $t_B$, where the burst period may be less than 1 second, to the selected time server. The controller may for example send one such burst to the selected time server during one burst interval to, where the burst interval may for example be 15 seconds. These parameters can be varied as required.

Under the NTPv4 protocol, the time server 14 responds to each such request with a response message, and each response message contains an indication of the time at which the response message is transmitted. It will be recognized that the response message includes additional information, but this indication, referred to as the "NTS timestamp" (NTSTS) is the only part of the response message that needs to be used in this method.

Thus, in step 56, the controller 30 receives the response messages from the time server 14 and, for each received response, calculates a time value using a clock derived from the local oscillator 28, this time value being referred to as the "local timestamp" (LTS).

A time window is then defined, beginning with the first response, and, in step 58, the controller 30 then calculates the network propagation delay (NPD) for the responses, if any, from each burst within the window. The window size is variable and may for example be ~15 min. The network propagation delay is calculated by subtracting the NTS timestamp from the local timestamp. Thus, for each response, the network propagation delay $NPD_i$ is derived from the NTS timestamp $NTSTS_i$ and the local timestamp $LTS_i$ as:

$$NPD_i = LTS_i - NTSTS_i$$

Figure 3:
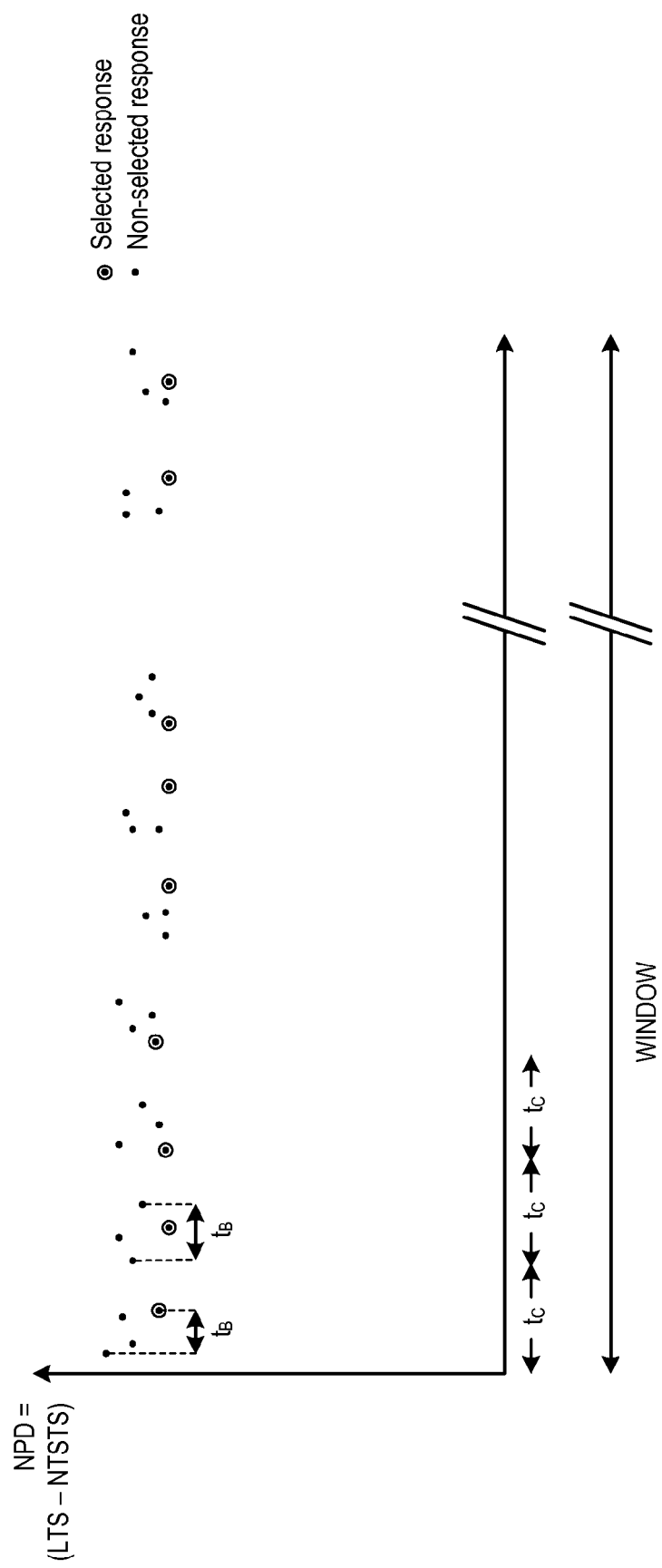
FIG. 3 illustrates a step in the method shown in FIG. 2.

FIG. 3 shows, for each of a series of responses within a time window, the calculated network propagation delay. Thus, within each burst period, of duration $t_B$, there are up to four responses.

In step 60, the controller 30 selects the one of the responses, from each burst period $t_B$, having the shortest network propagation delay. The selecting the one of the responses can be considered preselecting one response message from each burst of response messages. The network propagation delay for each response is calculated as above.

FIG. 3 shows the responses selected in step 60.

The process then passes to step 62, in which one of the responses selected in step 60 is provisionally selected as a representative response for that time window.

Specifically, the controller 30 selects the response having the shortest relative network propagation delay. The relative network propagation delay for each response is calculated as the network propagation delay for that response, relative to the position of that response within the window. Thus, for each response, the delta of both the local time stamp $LTS_i$ and the NTS time stamp $NTSTS_i$ from the local time stamp $LTS_1$ and the NTS time stamp $NTSTS_1$ of the first response in the window are calculated. The relative network delay $RDEL_i$ of that response is then given by:

$$RDEL_i = [(LTS_i - LTS_1) - (NTSTS_i - NTSTS_1)]/(LTS_i - LTS_1).$$

Figure 4:
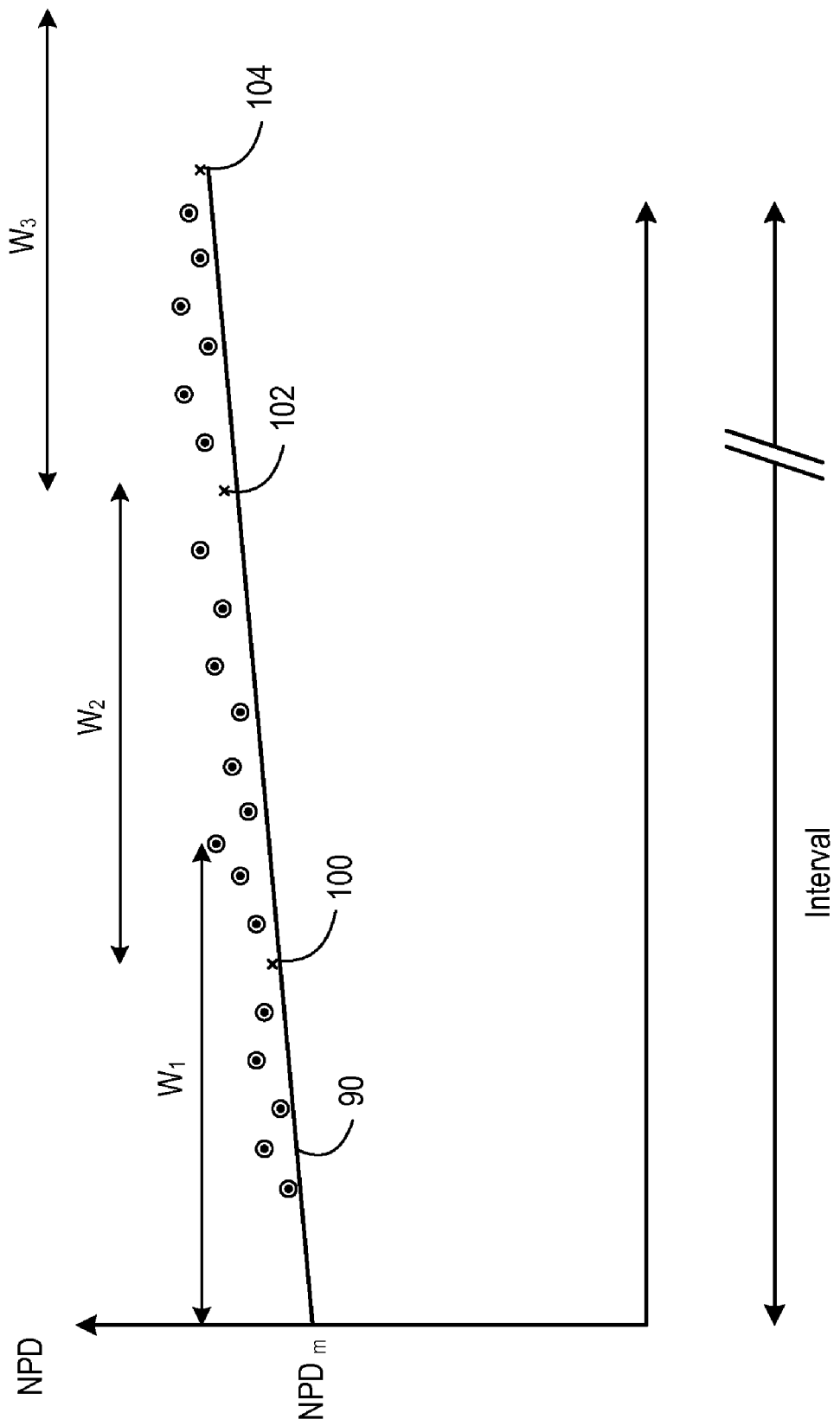
FIG. 4 illustrates a further step in the method shown in FIG. 2.

FIG. 4 illustrates the operation of this step. Thus, within a first time window $W_1$, there are a group of responses that have been selected in step 60. Amongst these selected responses, it is the response 100, marked with a cross, that has the shortest relative network delay, and so the response 100 is selected in step 62.

In step 64, this provisionally selected response is then entered in a sequence of selected responses.

It is then determined whether this provisionally selected response should in fact be taken into consideration when determining the accuracy of the oscillator 28.

Firstly, in step 66, the controller 30 performs a statistical process, somewhat similar to calculating the standard deviation (SD), to compare the relative network delays $RDEL_i$ of all of the responses within the window, relative to the chosen response. More specifically, it is determined whether a sufficiently large number of the responses within the window lie sufficiently close to the chosen response, to permit a high degree of confidence that the chosen response actually has a relative network delay that is close to the minimum network delay at that time.

In step 68, it is determined whether parameters are satisfied, relating to the quality of the data in the responses. For example, based on the statistical analysis performed in step 66, it might be determined whether, say, 60% of the selected responses lie within, say, 10% of the value of the chosen response. If this criterion is not met, or if there are too few samples in the window (for example <45) then the process passes to step 70.

In step 70, it is determined whether the initially defined window has already been expanded. If not, the process passes to step 72, in which the window is expanded and the statistical and sample count parameters applied in step 68 are relaxed. The process then returns to step 58, and the following steps are repeated. For example, the expanded window used in step 58 could be 45 minutes and the relaxed minimum sample count could be 90, while the relaxed statistical criterion used in step 68 might determine whether, say, 50% of the selected responses lie within, say, 12% of the value of the chosen response.

If it is then determined in the repeated step 68 that the parameters are still not satisfied, it will be determined in step 70 that the window has previously been expanded. In this case, it is likely that there is not a suitable sample within the window. There are several reasons why a window of responses would fail to meet either set of restrictions. For example, there may be too many lost responses to NTS requests, or too much jitter in the responses that are received, or there may be a step change in the propagation delay between the time server 14 and the femtocell basestation 20.

If it is determined in step 70 that the window has previously been expanded, the process passes to step 74. In this case, the time, statistical threshold and minimum sample count are returned to the original values, and the sample provisionally selected in step 62 is marked as discontinuous, indicating that it will not be used in analysing the results.

If it is determined in step 68 that the relevant criteria are satisfied, either at the first attempt or after expansion of the window, the process also passes to step 74. In this case, the sample provisionally selected in step 62 is marked as continuous, and will be used in analysing the results, as described below.

In step 76, it is determined if the previously defined time interval is complete. If not, the process passes to step 78, in which a new window is defined, starting with the response previously selected in step 62.

Thus, as shown in FIG. 4, after the selection of the response 100, a new window $W_2$ is defined, starting at the response 100. The response 102 is then selected from amongst the responses within the window $W_2$. In the next iteration, a new window $W_3$ is defined, starting at the response 102, and the response 104 is then selected from amongst the responses within the window $W_3$, and so on.

Following the definition of the new window, the process then returns to step 58, for the determination of a new selected response.

Once it is determined in step 76 that the defined time interval is complete, the process passes to step 80, in which a calculation is made regarding the accuracy of the oscillator in the femtocell basestation 20.

The interval between any discontinuous response and the previous response in the sequence is not used further. However, in order to calculate the accuracy of the local time and hence the local oscillator, the controller 30 calculates the elapsed local time and the NTS time between each pair of consecutive selected responses that have been marked in step 74 as continuous.

The operation of this step is illustrated in FIG. 4. Specifically, if it could be assumed that the local oscillator 28 in the femtocell basestation 20 were initially operating entirely accurately, then the time difference between the local time stamp and the network time server time stamp would accurately reflect the network propagation delay. In practice, there is more likely to be an additional offset, which is removed by taking the difference between successive values. The network propagation delay, in each case, will be the sum of a minimum network propagation delay and an unpredictable jitter component.

The aim of the selection steps, described above, is therefore to select responses in which this jitter component is as small as possible, and so the network propagation delay is as close as possible to the minimum network propagation delay.

In the example shown in FIG. 4, the initial minimum network propagation delay is $NPD_m$. However, as shown in FIG. 4, the minimum network propagation delay as determined in the femtocell basestation 20 increases slowly over time. Such a variation is assumed to be due, not to any real change in the network conditions (which may cause sudden variations in the minimum network propagation delay), but to increasing inaccuracy of the local oscillator 28.

One measure of the accuracy of the local oscillator can therefore be obtained by examining the variation in the measured network propagation delay between two successive selected responses that are marked as continuous. An improved measure over an interval can be calculated by the weighted sum of these accuracy values between successive responses within the interval. The local time interval between responses is used as the weighting factor.

Following the completion of the calculation in step 80, a result is obtained for the accuracy of the oscillator 28, and in step 82 this is taken as the completion of the process based on the responses from a first network time server 14.

As mentioned above, the process can be performed in parallel using different network time servers, for example so that multiple results are obtained for the same time interval. Any of these results that show significant variation from others can be disregarded and an average taken. The average could be weighted for each of the used network time servers, for example using a factor based on the statistical analysis performed at step 66 of the process shown in FIG. 3. Thus, network time servers that appear more reliable because their responses arrive closer together can be given more weight in this averaging.

There is thus disclosed a method of selecting responses from a timeserver that allows the selected responses to more accurately measure errors in frequency of a local oscillator.

The invention claimed is:

1. A method of determining an accuracy of an oscillator used to generate a local clock signal, the method comprising:
sending bursts of requests to a time server over a computer network;
receiving a plurality of bursts each of a plurality of timestamped response messages from the time server over the computer network, each of said response messages being subject to a network propagation delay, said network propagation delay being a sum of a minimum network propagation delay and a jitter component;
for each received response message, determining an apparent network propagation delay as a function of a difference between a first timestamp applied by the time server and a second timestamp based on a clock derived from said oscillator;

preselecting one response message from each burst of response messages having a minimum apparent network propagation delay;

defining a time interval, over which the accuracy of the oscillator is to be determined;

dividing said time interval into time windows;

within each time window, selecting one of the preselected response messages as the minimum network propagation delay response message, based on the determined network propagation delay of each preselected response message and each preselected response message's corresponding time position within said time window; and determining the accuracy of the oscillator based on changes over time in the apparent network propagation delays of the selected received response messages.

2. A method as claimed in claim 1, comprising:

defining a first time window;

selecting a response from the first time window;

defining a further time window starting at the selected response from the first time window; and selecting a response from the further time window.

3. A basestation for a cellular communication system, comprising:

an interface, for connection to a computer network;

an oscillator, for generating a clock signal;

a controller, for adjusting the oscillator, wherein the controller is adapted to:

send bursts of requests to a time server over a computer network;

receive a plurality of bursts each of a plurality of timestamped response messages from the time server over the computer network, each of said response messages being subject to a network propagation delay, said network propagation delay being a sum of a minimum network propagation delay and a jitter component;

for each received response message, determine an apparent network propagation delay as a function of a difference between a first timestamped applied by the time server and a second timestamp based on a clock derived from said oscillator;

preselect one response message from each burst of response messages having a minimum apparent network propagation delay;

define a time interval, over which the accuracy of the oscillator is to be determined;

divide said time interval into time windows;

within each time window, select one of the preselected response messages as the minimum network propagation delay response message, based on the determined network propagation delay of each preselected response message and each preselected response message's corresponding time position within said time window; and determine the accuracy of the oscillator based on changes over time in the apparent network propagation delays of the selected received response messages; and adjust the oscillator based on said determined accuracy.

4. A basestation as claimed in claim 3, further comprising:

transceiver circuitry, for generating transmit and/or receive frequency signals from an output of said oscillator.

\* \* \* \* \*